BROOKS & GROVER.
Gridiron.
No. 29,238.
Patented July 24, 1860.
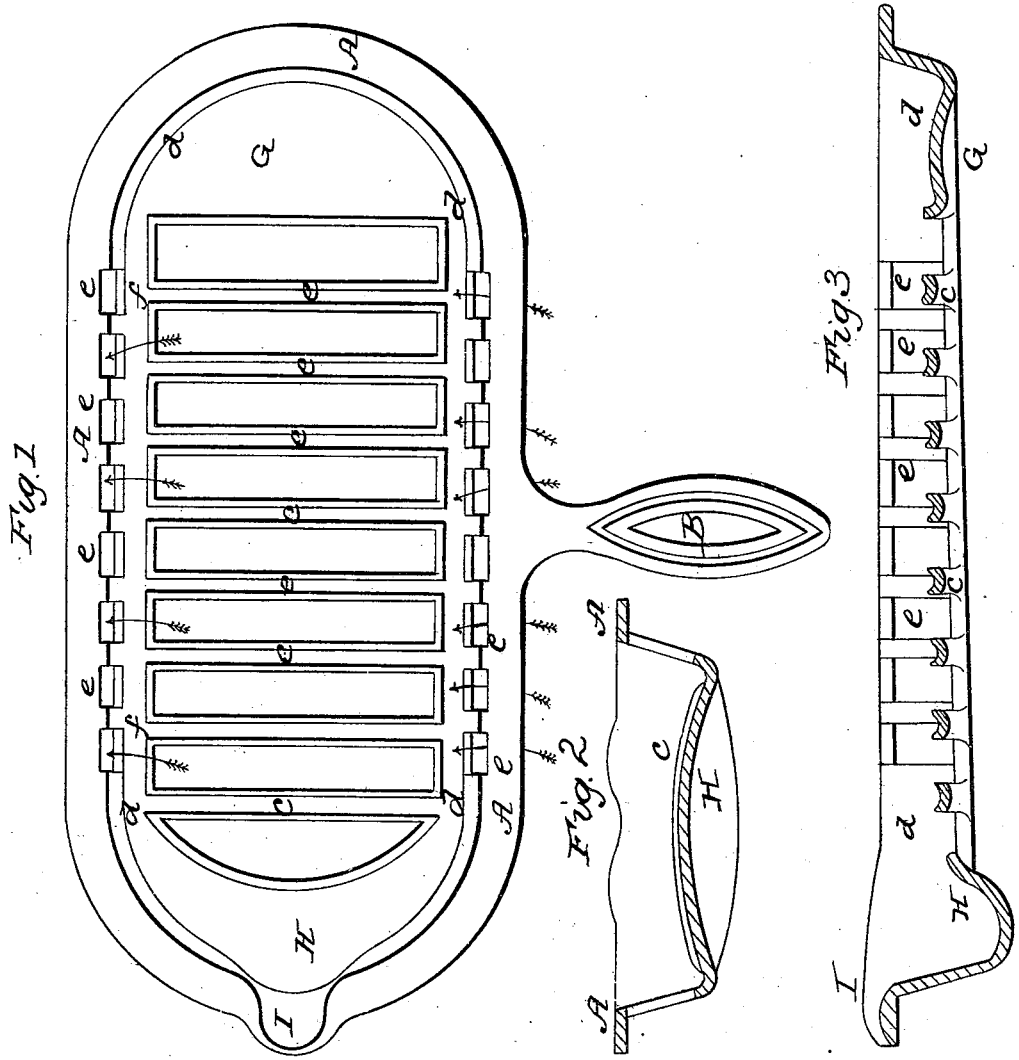
WITNESSES
J. Fraser.
S. J. Allis
INVENTORS
John S. Brooks
Leavitt B. Grover

UNITED STATES PATENT OFFICE.

JOHN S. BROOKS AND LEAVITT B. GROVER, OF ROCHESTER, NEW YORK.

GRIDIRON.

Specification of Letters Patent No. 29,238, dated July 24, 1860.

*To all whom it may concern:*

Be it known that we, J. S. BROOKS and L. B. GROVER, both of Rochester, in the county of Monroe and State of New York, have invented a new and Improved Gridiron; and we do hereby declare that the following is a full and exact description thereof, reference being had to the accompanying drawings, making part of this specification, in which—

Figure 1 is a horizontal or plan view of the invention. Fig. 2 is a transverse section, and Fig. 3 a longitudinal section.

Similar letters designate corresponding parts in all the figures.

Our improved gridiron consists of an oblong pan-formed utensil, which is intended to occupy the space of two stove holes when the separating bar between them is removed. It has a horizontal flange or rim A, extending all around it, to one side of which the handle B is attached, forming the front. The bottom consists of a grate, or bars, $c$ $c$, placed transversely, in the usual manner, but situated at a depth of two to three inches or thereabout from the flange A, it being connected therewith by the flaring sides $d$ $d$. The front and back sides are provided with openings $e$ $e$ for the passage of air and flame, and for the escape of the smoke and odors which arise from the meat in the process of cooking. When placed upon a stove or range, the flange A, rests on the top thereof, while the grate and sides are below, bringing the meat nearer the coals, it being more especially designed for coal stoves. The openings on the front side communicate with the fire chamber, while those at the back are adjacent to the flue passages, the consequence of which arrangement is that the heated air is drawn through in the direction of the arrows from the front of the fire to the flues, passing over the meat and cooking the upper surface thereof, while it is exposed to the heat of the fire direct from below. This hastens the process of cooking, and by searing and closing the vesicles on the top surface of the meat prevents the juices being rapidly evaporated as is usual by the common process where the heat is applied underneath alone, the result of which is, that the steak is more tender, juicy and highly flavored. Another effect produced is that the smoke and fumes which arise from the cooking are carried directly into the flues of the stove or range, and escape up the chimney, instead of into the atmosphere of the kitchen.

The bars $c$ $c$ are made higher in the middle, and incline equally to both sides where their grooves connect with the lateral channels $f$ $f$. These channels start from the rendering pan G, which is a space prepared to receive the portions of fat meat which are cut from the lean parts before they are laid upon the grate. These fatty portions are exposed to about as great a degree of heat as those upon the grate, the bottom G, being of the same depth as the latter, and the fat is therefore fried out or rendered, while the broiling process is progressing, and follows the channels $f$ $f$, which descend slightly, until it is deposited in the reservoir for gravy, H, from which, after the meat is removed from the bars, it is poured through the spout I. The fat portions if left without separation from the lean, would burn from contact with, or dripping into the flames, making it unfit for the table, and producing an offensive odor, but by this method the broiling and frying are both effected at the same time and each in the perfection of its peculiar process.

What we claim as our invention and desire to secure by Letters Patent, is—

An improved cooking utensil, consisting of the sunken grate $c$ with the air and flame-passages $e$ $e$, at the sides thereof, frying surface G, and reservoir H, arranged and combined substantially in the manner and for the purposes shown and described.

JOHN S. BROOKS.
LEAVITT B. GROVER.

Witnesses:
J. FRASER,
S. J. ALLIS.